(12) United States Patent
Prendergast

(10) Patent No.: US 6,938,276 B1
(45) Date of Patent: *Sep. 6, 2005

(54) SHROUD PLATE ATTACHMENT

(75) Inventor: Jonathon R. Prendergast, Newport Beach, CA (US)

(73) Assignee: Norotos, Inc., Santa Ana, CA (US)

(*) Notice: Subject to any disclaimer, the term of this patent is extended or adjusted under 35 U.S.C. 154(b) by 65 days.

This patent is subject to a terminal disclaimer.

(21) Appl. No.: 10/820,977

(22) Filed: Apr. 7, 2004

(51) Int. Cl.$^7$ ................................................. A42B 1/24
(52) U.S. Cl. .............................. 2/422; 2/6.2; 403/408.1
(58) Field of Search .............................. 2/6.2, 6.3, 6.6, 2/422; 403/408.1, 321, 325, 326; 248/222.11, 222.13, 221.11, 222.51, 224.7, 205.1, 231.91; 359/409, 815; 224/181, 271; 411/172, 173, 176, 967, 183, 184

(56) References Cited

U.S. PATENT DOCUMENTS

| | | | |
|---|---|---|---|
| 1,226,101 A | | 5/1917 | Marsden |
| 1,342,225 A | * | 6/1920 | Perlman ...................... 301/20 |
| 2,284,180 A | * | 5/1942 | Thomas ........................ 403/20 |
| 2,895,137 A | * | 7/1959 | Simpson et al. ............... 2/422 |
| 4,224,694 A | * | 9/1980 | Palmaer .......................... 2/422 |
| 4,449,787 A | | 5/1984 | Burbo et al. |
| 4,553,873 A | | 11/1985 | Salice |
| 4,671,697 A | * | 6/1987 | Ando et al. .................. 403/325 |
| 4,689,834 A | | 9/1987 | McCarthy et al. |
| 4,697,783 A | | 10/1987 | Kastendieck et al. |
| 4,901,210 A | * | 2/1990 | Hanabusa .................... 362/106 |
| 4,987,608 A | | 1/1991 | Cobb |
| 5,006,025 A | * | 4/1991 | Duran ........................ 411/183 |
| 5,020,952 A | * | 6/1991 | Zeigler et al. ............... 411/113 |
| 5,176,342 A | | 1/1993 | Schmidt et al. |
| 5,179,735 A | | 1/1993 | Thomanek |
| 5,226,181 A | * | 7/1993 | Polednak et al. ............... 2/422 |
| 5,297,851 A | * | 3/1994 | Van Hekken .......... 297/452.14 |
| 5,331,684 A | | 7/1994 | Baril et al. |
| 5,339,464 A | | 8/1994 | Dor |
| 5,347,119 A | | 9/1994 | Connors |
| 5,408,086 A | | 4/1995 | Morris et al. |
| 5,416,922 A | * | 5/1995 | Horvat et al. ................... 2/6.2 |
| 5,467,479 A | | 11/1995 | Mattes |
| 5,469,578 A | | 11/1995 | Mattes |
| 5,471,678 A | | 12/1995 | Dor |
| 5,506,730 A | | 4/1996 | Morley et al. |
| 5,542,627 A | | 8/1996 | Crenshaw et al. |
| 5,581,806 A | | 12/1996 | Capdepuy et al. |
| 5,648,862 A | | 7/1997 | Owen |
| 5,703,354 A | | 12/1997 | Wannagot et al. |
| 5,914,816 A | | 6/1999 | Soto et al. |
| 6,249,386 B1 | * | 6/2001 | Yona et al. ................. 359/630 |
| D449,411 S | | 10/2001 | Largeot |
| 6,457,179 B1 | | 10/2002 | Prendergast |
| 6,472,776 B1 | | 10/2002 | Soto et al. |
| 6,662,370 B1 | * | 12/2003 | Buchanan, Jr. ................. 2/6.2 |
| 6,751,810 B1 | | 6/2004 | Prendergast |

FOREIGN PATENT DOCUMENTS

FR     2677604 A1 * 12/1992     ............ A42B/3/04

* cited by examiner

Primary Examiner—Rodney M. Lindsey
(74) Attorney, Agent, or Firm—Christie, Parker & Hale, LLP

(57) ABSTRACT

A shroud plate for headgear is provided that may comprise a shell, an insert, a lock, a release mechanism wherein the shell extends around at least a portion of the insert has a smooth surface with rounded edges and corners and is shaped to match the contour of the headgear, and at least one attachment point wherein the attachment point is laterally movable within a restricted area. Further, the shroud plate may be attachable to headgear at a single attachment point and may be given rotational stability by an elevated ridge or a plurality of legs which may extend over or wrap around an edge of the headgear.

10 Claims, 14 Drawing Sheets

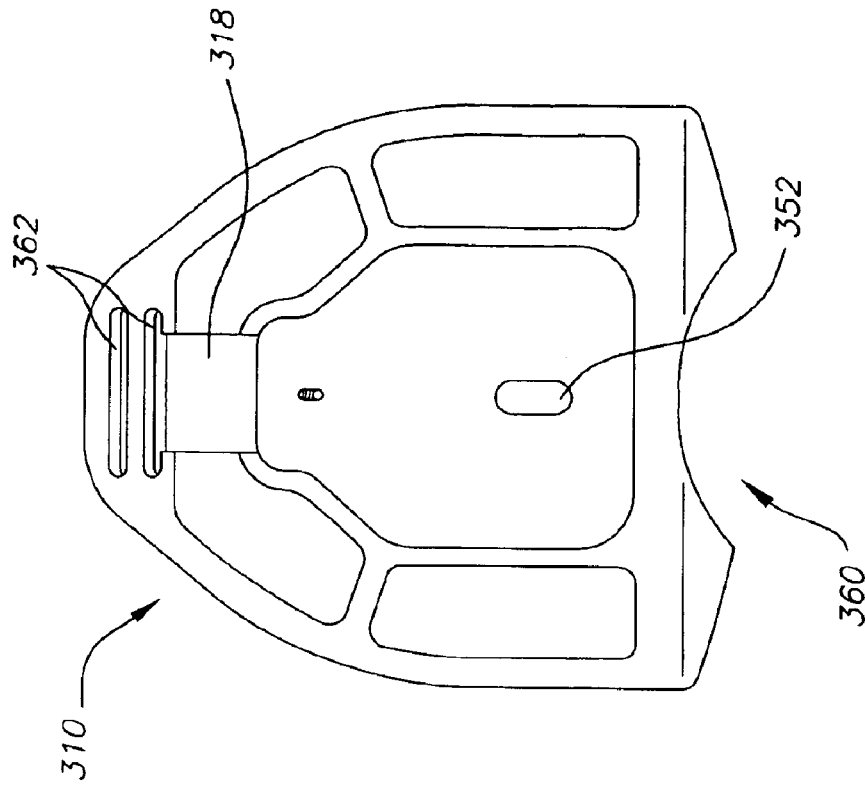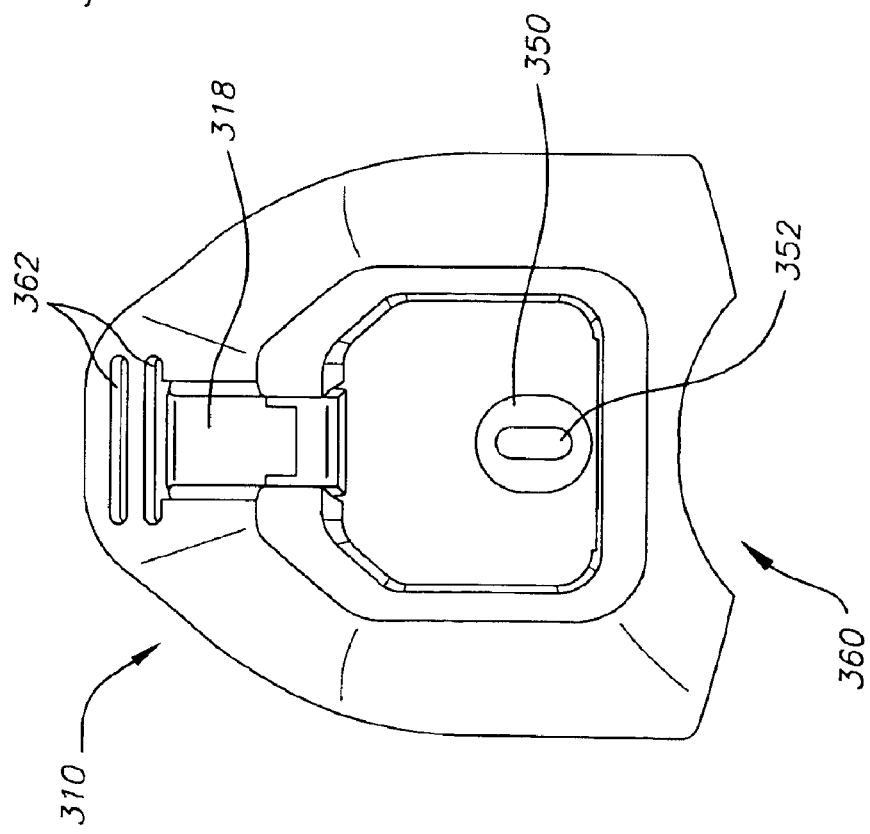

SHROUD PLATE ATTACHMENT

FIELD OF THE INVENTION

This invention relates to helmet attachment mechanisms used with mounting assemblies for night vision devices, and more particularly to a shroud plate which may act as an interface between a helmet and the helmet mount for a night vision device.

BACKGROUND OF THE INVENTION

Night vision devices are commonly used by military personnel for conducting operations in low light or night conditions. The night vision devices used by the military typically include image intensifier tubes and associated optics that convert infrared and near infrared light into viewable images. A common night vision device currently being used in the U.S. Army is the PVS7 night vision goggle, manufactured by ITT Corporation of Roanoke, Va.

Assemblies for mounting night vision devices to a helmet are well-known in the art. These mounting assemblies allow a user's hands to remain free while viewing a scene through the night vision device. It is also desirable for these mounting assemblies to be removable from the helmet so that they do not interfere with a user's actions when they are not needed, such as during the daytime or when a user parachutes from an airplane.

A night vision device may be attached to a helmet through a helmet attachment mechanism which acts as an interface between a helmet mount and the helmet. In previous designs, helmet attachment mechanisms have been attached to a helmet by a strap secured around the helmet, by fasteners or most recently, by a shroud plate as described in, for example, U.S. Pat. No. 6,751,810 to Prendergast, which is incorporated herein by reference.

Shroud plates have heretofore generally been attached to helmets by three screws which are threaded into three corresponding flanged threaded inserts drilled into the shell of the shroud plate. The screws are inserted from the inside of the helmet, through the helmet and into the flanged threaded inserts of the shroud plate. It has been found, however, that the holes for the screws are not drilled in exactly the same locations on each helmet. More specifically, it has been found that the placement of holes for the screws varies by about 0.1 inch per hole.

Additionally, some helmets, due to perhaps a previous night vision goggle mount attachment or to the attachment of internal support webbing for the user's head, already have a single hole drilled into the front center surface. Rather than risk compromise to the structural integrity of the helmet by drilling more holes and to minimize the time needed for retrofit, it is desirable to attach a shroud plate with one screw rather than three. Moreover, some helmets have no holes predrilled therein and it is desirable to minimize the number of holes needed for attachment to maintain structural integrity and minimize the time needed for attachment of a shroud plate.

Finally, it has been found that some helmets have a larger brim than others, and the larger brim makes the location of the release button on the shroud plate important to ease of use. Thus, it is desirable to have an attachment mechanism that allows a user to detach a night vision goggle mount despite having a brim on his or her helmet.

These and other issues exist with the helmet attachment mechanisms for night vision devices disclosed in the prior art. Consequently a need exists for a further improved helmet attachment mechanism.

SUMMARY

The present invention provides for a shroud plate for headgear comprising a shell, an insert, a lock, a release mechanism wherein the shell extends around at least a portion of the insert has a smooth surface with rounded edges and corners and is shaped to match the contour of the headgear, and at least one attachment point wherein the attachment point is laterally movable within a restricted area. Further, the shroud plate may be attachable to headgear at a single attachment point and may be given rotational stability by an elevated ridge or a plurality of legs which may extend over or wrap around an edge of the headgear.

BRIEF DESCRIPTION OF THE DRAWINGS

FIG. 15 is a front view of an alternate embodiment of a shroud plate of the present invention having a single attachment point.

FIG. 16 is a back view of an alternate embodiment of a shroud plate of the present invention having a single attachment point.

DETAILED DESCRIPTION

Figure 1:
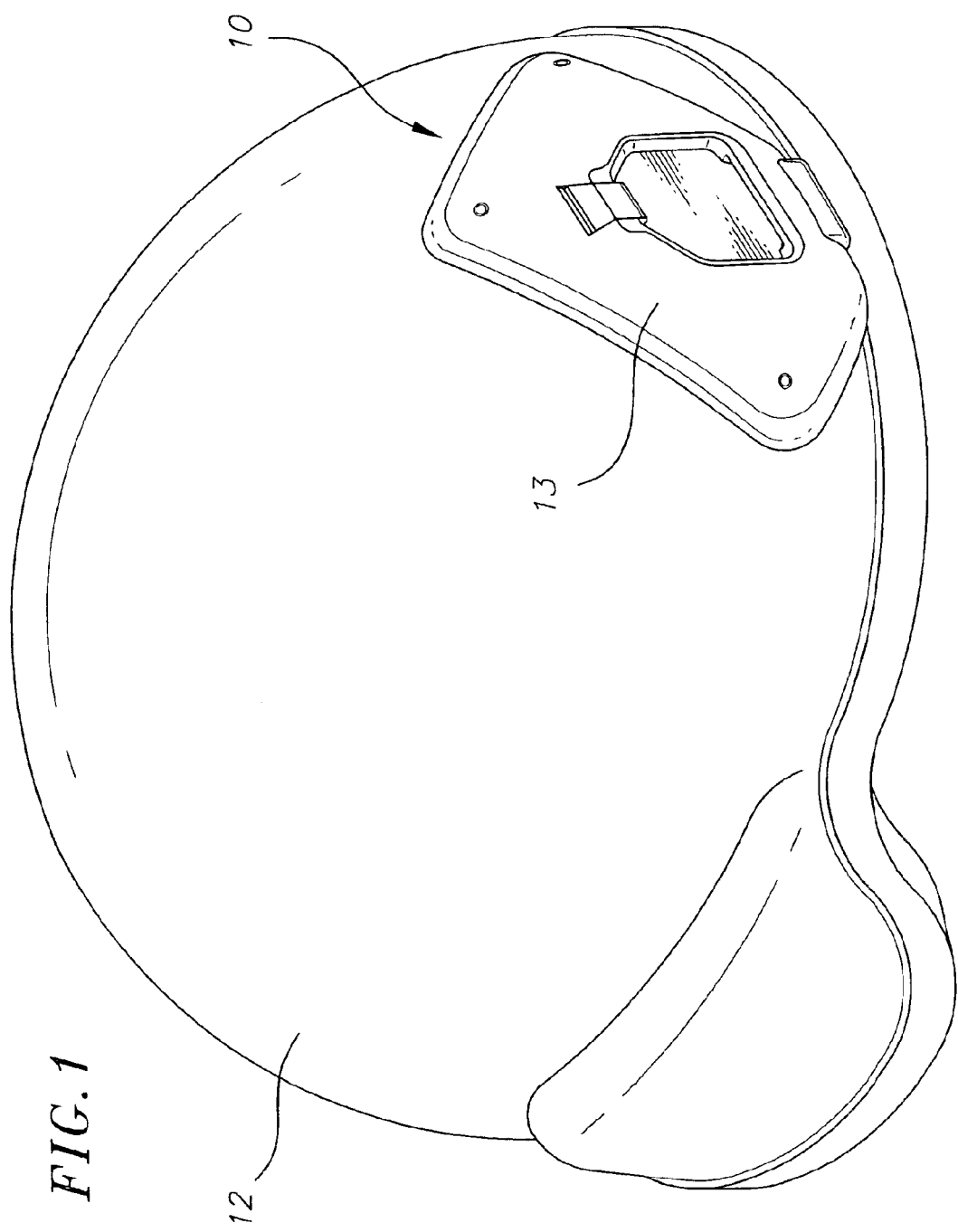
FIG. 1 is a perspective view of a shroud plate attached to a helmet.

An exemplary embodiment of a shroud plate is shown in FIG. 1. The shroud plate 10 is shown attached to a standard U.S. Army Kevlar composite helmet 12. The helmet is based on U.S. Design Patent 449,411 to Largeot and is manufactured by CGF Helmets, Inc. of Akron, Ohio. In an exemplary embodiment, the shroud plate 10 may be attached to the helmet 12 by stainless steel screws 14 inserted into openings in the helmet 12 and shell 13. Flanged threaded inserts 15 may be driven into holes machined into shell 13. Threaded inserts 15 may also comprise a knurled outer surface in order to more securely attach them to the shell 13 when they are inserted into the machined hole. The threaded portion of the insert may also comprise two opposite halves attached to a flange at one end of the insert with a small gap separating the halves on their longitudinal axis. This separation allows the inserts to expand slightly when screws are threaded into them, tightly securing them to the shell 13. However, the shroud plate 10 may also be attached to the helmet 12 in any manner sufficient to secure a helmet attachment mechanism to the helmet 12 and support the accompanying helmet mount and night vision device. A shroud plate 10 may be retrofitted to any suitable helmet or other headgear, and it will be understood by those skilled in the art that the invention is not restricted to the helmet shown.

Figure 2:
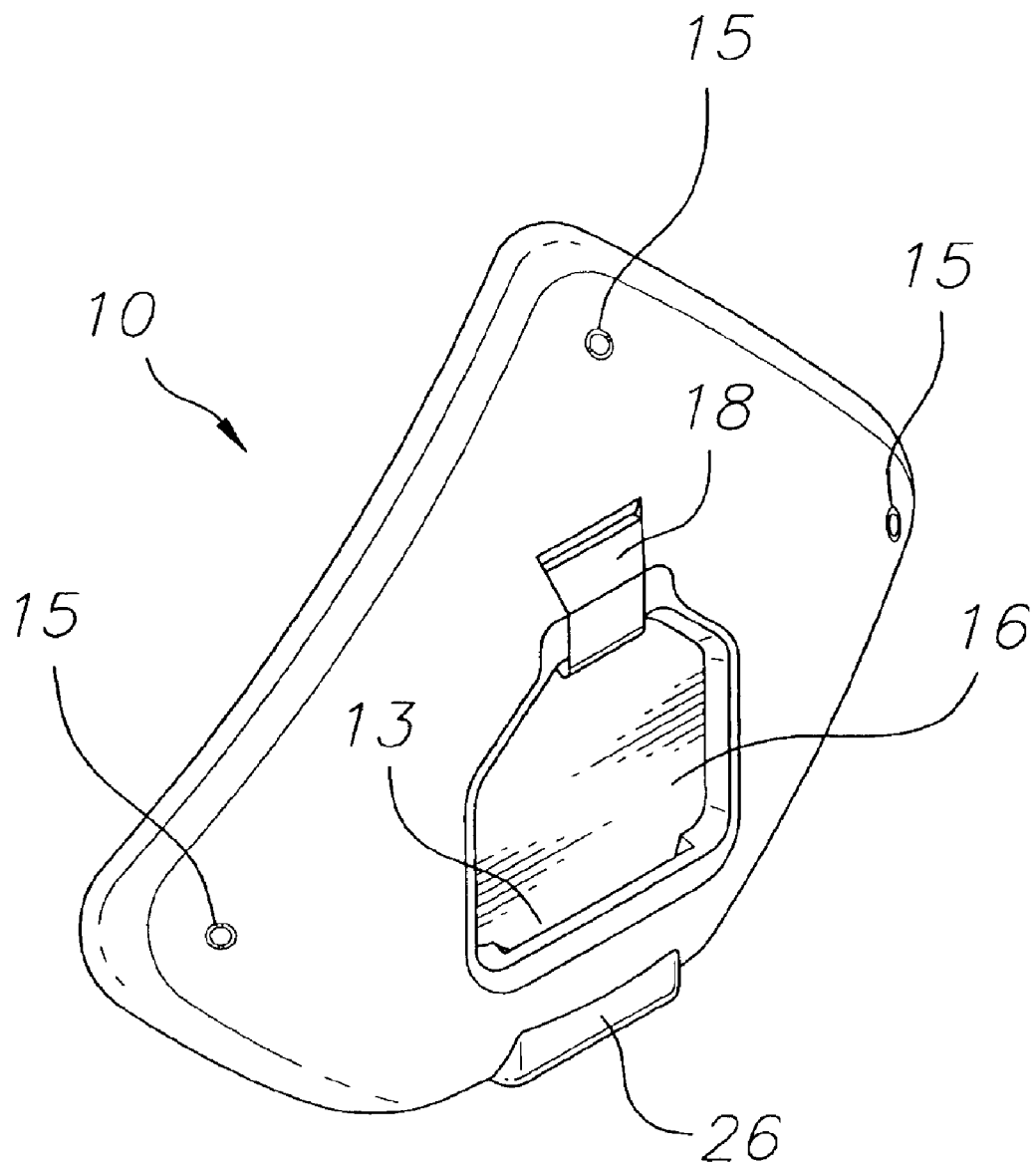
FIG. 2 is a perspective view of a shroud plate.

FIG. 2 shows a front side view of an exemplary embodiment of a shroud plate. The shroud plate 10 comprises a shell 13 which may be manufactured to fit the contour of a helmet. In one exemplary embodiment, the shell 13 may be machined from a block of nylon 6/6. However, the shell 13 may be manufactured from any suitable material sufficient to sustain the forces subjected to it during operation. The shell 13 may alternatively be injection molded from nylon 6/6 or a suitable polymer. When the shell 13 is injection molded, its walls are about $80/1000$ inch on all sides and the back side of the shell may comprise indented sections separated by support ridges. The indented sections allow the shell 13 to be a minimum weight while still providing a suitably sturdy base for the shroud plate 10. In addition to fitting the shell 13 to the contour of the helmet 12, the top surface of the shell 13 may be smooth with rounded edges and corners. Fitting the shell 13 to the shape of the helmet 12 and having a smooth surface with rounded edges and corners on the shell 13 ensures that there are no unnecessary edges on which another object, such as a shroud line of a parachute or a dangling tree branch in heavy foliage, may catch. The top surface of the shroud plate may also be sand blasted or otherwise treated or roughened so as to have a matte, non-shiny surface. The screws 14 which secure the plate 10 to the helmet 12 may be inserted from the inside of the helmet so that the heads of the screws are not exposed on the external surface. The length of the screws is such that the bodies of the screws 14 do not protrude beyond the external surface of the shell 13. The screws 14, however, should be long enough to securely attach the shell 13 to the helmet 12.

Figure 9:
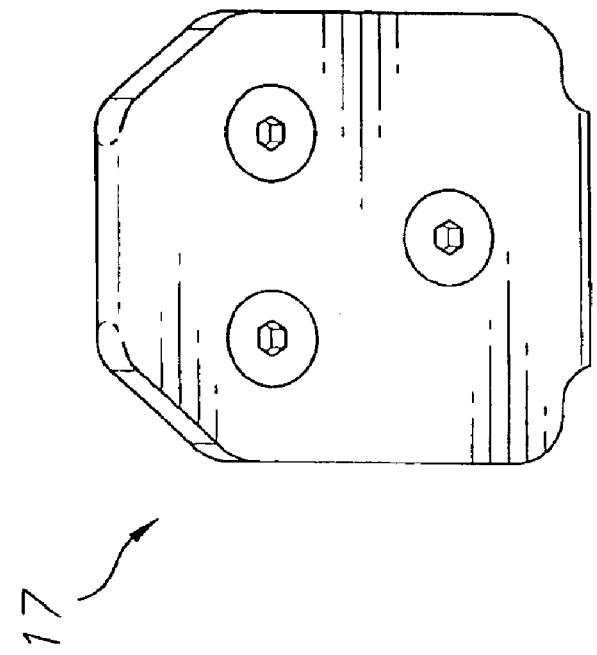
FIG. 9 is a perspective view of a lock plate.

An exemplary embodiment of a shroud plate further comprises an aluminum insert or receiving plate 16. The insert 16 could also be made of titanium or other suitable materials. The insert 16 is designed as a bay for a lock plate or adapter plate 17 (see FIG. 9) and functions as the interface between a helmet mount and a helmet 12. The shroud plate 10 may comprise an insert 16 that is integral with a shell 13 essentially making the plate one piece. The shroud plate 10 may comprise two integrally related pieces, the shell 13 and the insert 16, to optimize weight and durability. A lightweight shell minimizes the weight a user must bear while a durable lock plate ensures a sturdy interface between a helmet mount and a helmet. However, it is also possible that the shroud plate 10 may be one piece made from one material, for example all nylon or all aluminum.

In order to secure the lock plate 17, the base of the insert 16 may be indented from the top surface of the plate. Further, the insert 16 may comprise a hollowed indentation 19 on a side wall to fit a corresponding edge of the lock plate 17. The insert 16 may also comprise an opening in a side wall designed to accommodate a lock 18 which is slidably coupled to the insert 16.

Figure 4:
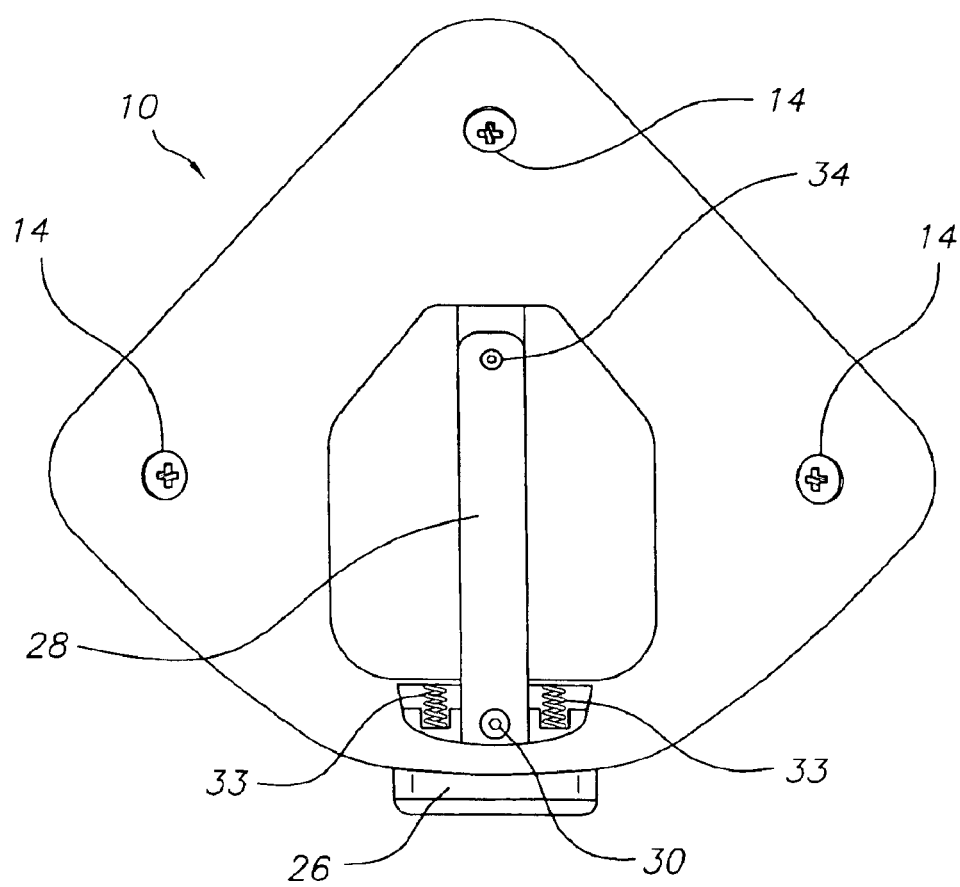
FIG. 4 is a back view of the shroud plate.
Figure 6:
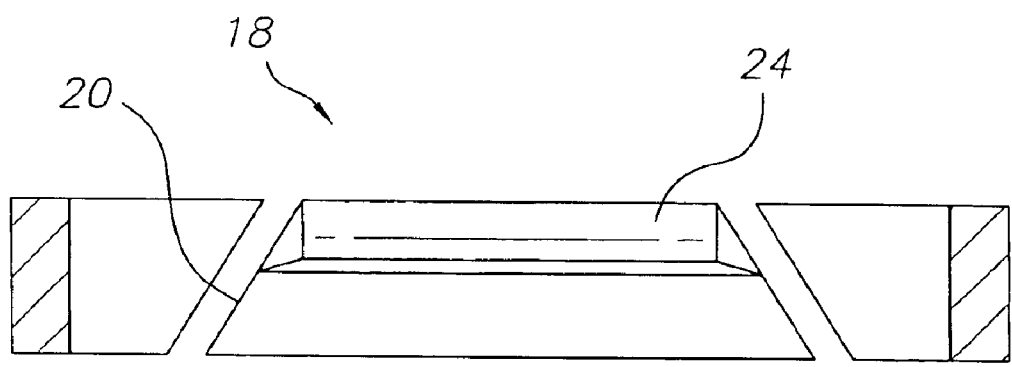
FIG. 6 is a bottom view of a lock.
Figure 7:
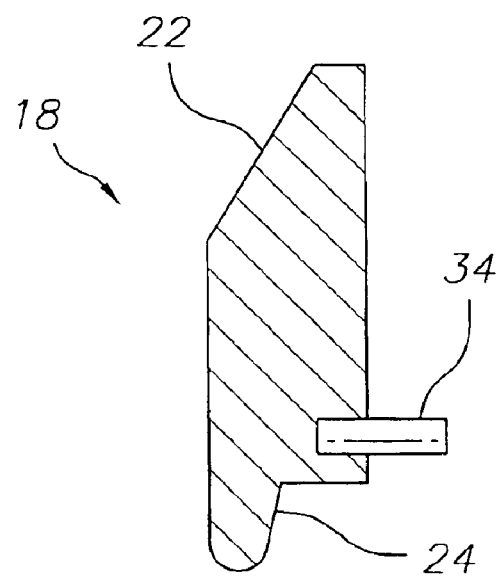
FIG. 7 is a side view of the lock.
Figure 8:
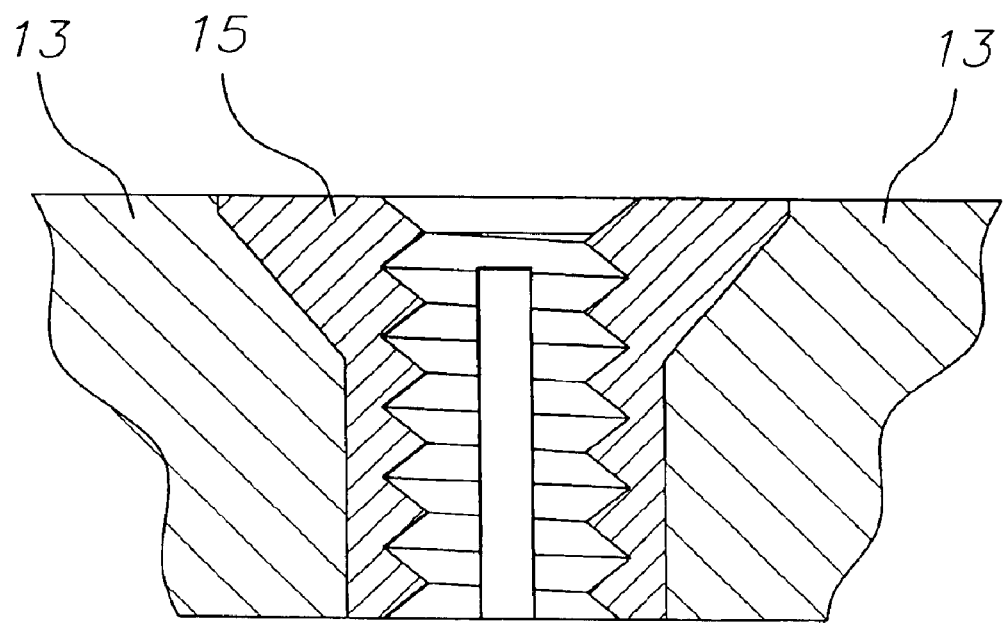
FIG. 8 is a side view of a flanged insert.
Figure 10:
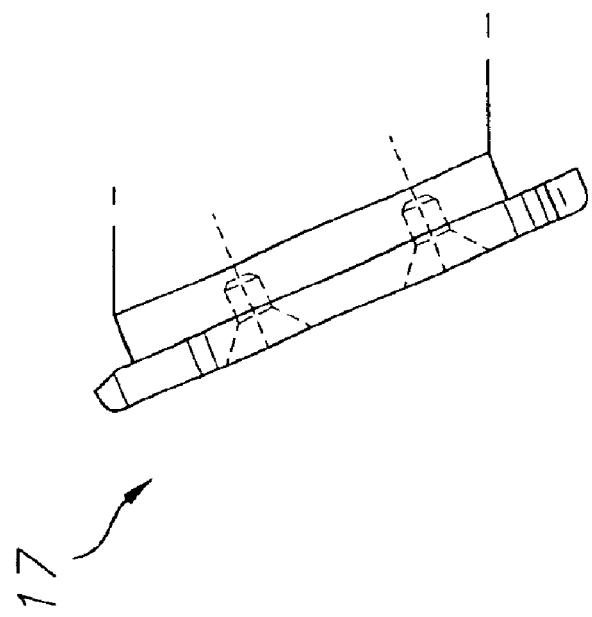
FIG. 10 is a side view of the lock plate.

As shown in FIG. 6, the sides 20 of the lock 18 may be tapered into a dovetail shape in order to secure the lock 18 to the insert 16 at the opening in the side wall, which opening has a mating dovetail shape. In a preferred embodiment, as shown in FIG. 7, the top surface 22 of the lock 18 is contoured to match that of the shell 13 in order to ensure a smooth surface. Also, in a further preferred embodiment, the rear of the lock 18 may comprise a tapered overhanging ledge 24 which serves to further secure the lock plate 17 when it is introduced into the insert 16. With further reference to FIG. 7, a protrusion 34 may extend from the bottom surface of the lock 18. Protrusion 34 allows for the lock 18 to be connected to release button 26 by a link plate 28 as shown in FIG. 4. Protrusion 34 may be attached to lock 18 by a threaded insert or by any other suitable means. Lock 18 may be connected to link plate 28 by a rivet, bolt, screw or any other appropriate means for attachment. In a preferred embodiment, the lock 18 may be machined from titanium. However, the lock 18 may also be manufactured from any other suitable material.

Figure 5:
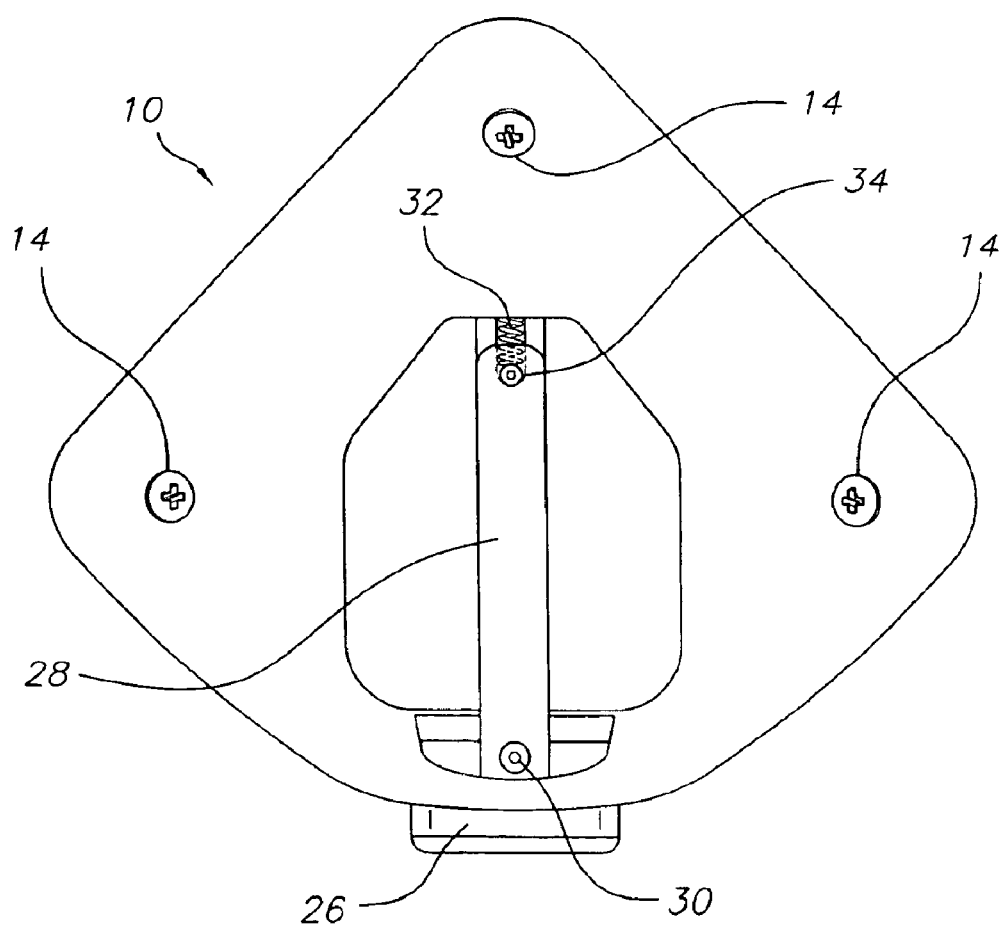
FIG. 5 is a back view showing an alternate embodiment of the shroud plate.

FIG. 4 shows a back side view of an exemplary embodiment of a shroud plate. Release button 26 may be attached to link plate 28 by a rivet, a bolt or a screw 30, or by any other means sufficient to secure them together. Release button 26 and link plate 28 may be machined from aluminum and titanium respectively in a preferred embodiment or any other suitable material. Link plate 28 may have drilled openings at either end to accommodate means for attaching release button 26 and lock 18 to it. The back surface of insert 16 may be contoured to the shape of the helmet 12, but may also contain a flat center channel which houses the link plate 28 and allows it to slide on a smooth surface. In a presently preferred embodiment, two springs 33 may be placed between the release button 26 and the rear of the insert 16 on opposite sides of the link plate 28. Springs 33 bias lock 18 to secure the lock plate 17 until release button 26 is pressed, thereby counteracting the bias of the springs 33, moving the lock 18 out of the way and allowing the night vision device to be removed. In an alternate embodiment, as shown in FIG. 5, a spring 32 may be placed between protrusion 34 on the lock 18 and a wall formed by the shell 13 where it meets the insert 16.

In operation, a user may attach a night vision device to the shroud plate 10 by fitting one edge of the lock plate 17 into the hollowed indentation 19 of the insert 16. In order to introduce the lock plate 17 to the insert 16, the user may press the lock plate 17 against the lock 18, forcing the lock 18 to displace enough to allow the lock plate 17 to become flush with the insert 16, a snap-lock action. A rounded front edge on the ledge 24 allows the lock plate 17 to displace the lock 18 upon insertion by a user. Tapered sides interface between the insert 16 and the lock plate 17 and also between the lock plate 17 and the lock 18. These tapered sides create a secure fit between the components. Further, the tapered top surface of the lock plate 17 matching the tapered ledge 24 should provide for automatic adjustment to normal wear between the mating surfaces. The user also may depress and hold the release button 26 which will move the overhanging ledge 24 of the lock 18 to allow insertion of the lock plate 17. Once the lock plate 17 is flush with the insert 16, the user may let go of the release button 26. Springs 33 will then cause the lock 18 and release button 26 to return to their original position, with the ledge 24 of the lock 18 securing the lock plate 17 to the insert 16. The tapered interface of ledge 24 prevents casual separation of the lock plate 17 from the insert 16 without displacement of the lock 18.

In order to release the night vision device from the insert 16, the user may depress and hold the release button 26. The ledge 24 of the lock 18 will again slide upward, allowing removal of the lock plate 17.

Figure 3:
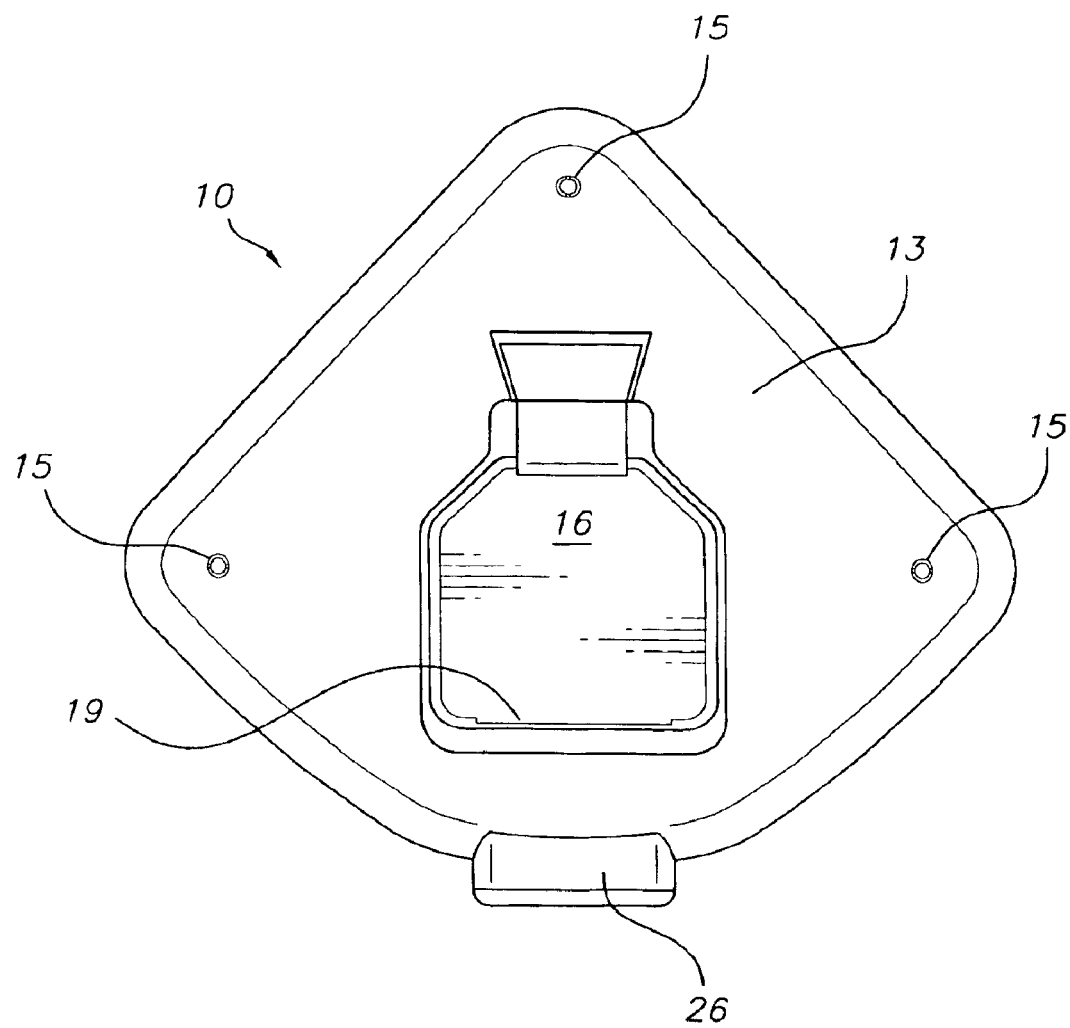
FIG. 3 is a front view of the shroud plate.

As shown in FIG. 3, the release button 26 is centrally located at the bottom of the shell 13, which allows the user to reach up in a natural motion and have their thumb in position to depress the release button 26 and thereby disengage the night vision device from the insert 16. Having a centrally located release button 26 further allows a right-handed or left-handed person the same ease of release. The release button 26 may also have rounded edges and a bottom edge contoured to match the rounded bottom edge of the shell 13. The lock 18 and release button 26 may be positioned opposite one another at different sides of the insert 16. Further, alternate arrangements of the lock 18 and release button 26 are possible. For instance, the release button 26 may be located adjacent to the lock 18.

Figure 11:
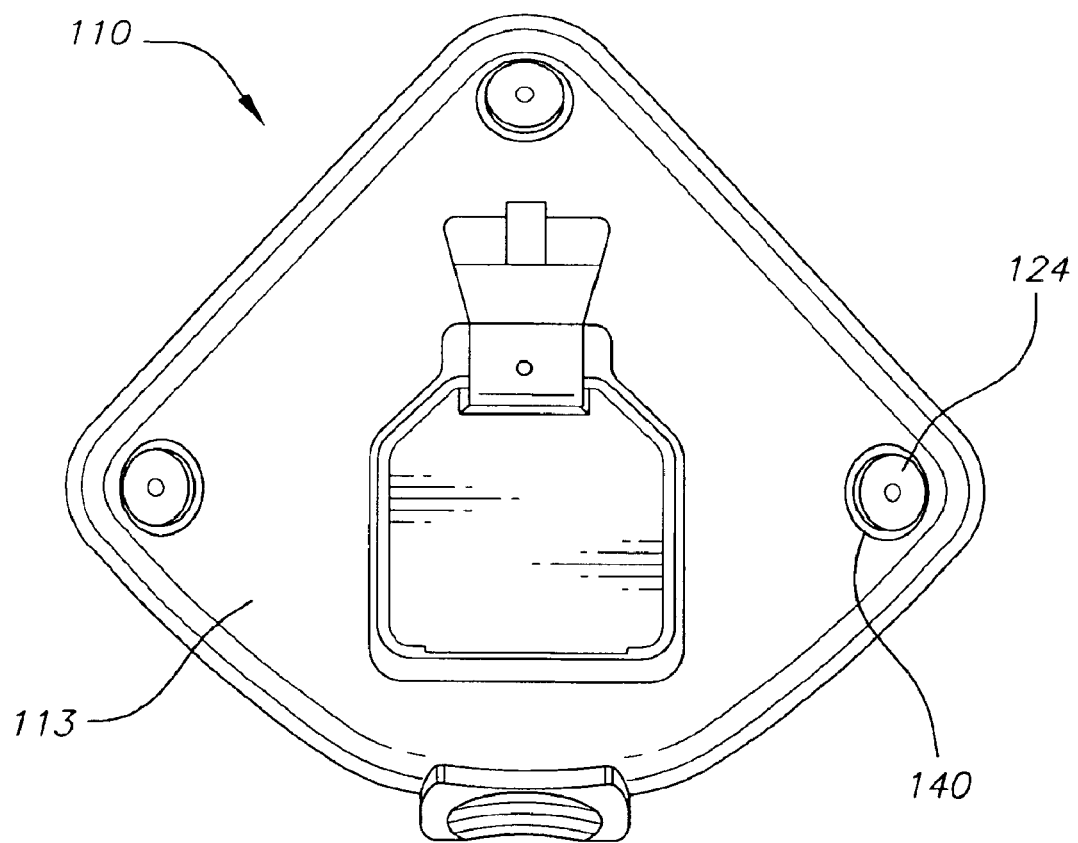
FIG. 11 is a front view of a shroud plate of the present invention having floating attachment points.
Figure 12:
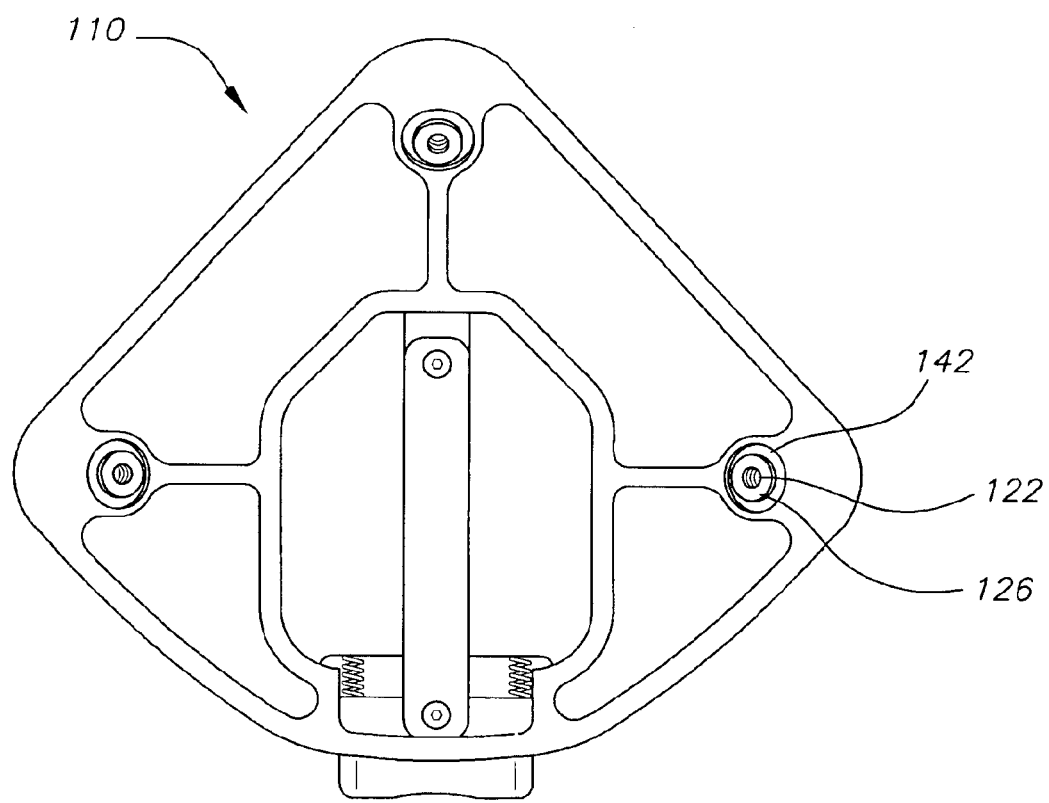
FIG. 12 is a back view of a shroud plate of the present invention having floating attachment points.

It has been found that when holes are drilled into a helmet to receive a shroud plate attachment means, there is slight variation as to the location of the holes on each helmet. More specifically, the location of the holes may vary from helmet to helmet by about 0.1 inch. In order to allow for these slight variations in the locations of holes drilled into helmets, one embodiment of the present invention includes floating attachment points. As shown in FIG. 11, a recess 140 is machined or molded into an exterior surface of a shell 113 of a shroud plate 110 at each floating attachment point location. Although to be most efficient, the exterior recess 140 may be round, the exact shape of the recess is not critical as long as it is sufficient to accommodate movement of the floating attachment points. In an exemplary embodiment, the diameter of the exterior recess 140 may be about 0.5 inch. A hole (not shown) may be drilled through the center of the exterior recess 140 to allow for the insertion of a shroud plate attachment means, for instance, a threaded cylinder 122 (FIG. 12). In a preferred embodiment, the cylinder 122 may have a smaller diameter than the hole, allowing the cylinder to move laterally within the hole. More specifically, in an exemplary embodiment, the diameter of the cylinder 122 may be about 0.19 inch and the diameter of the hole may be about 0.29 inch. The cylinder 122 may further comprise a front plate 124 wider in diameter than the hole which is adapted to fit into the exterior recess 140. The front plate 124 may preferably have a smaller area than the recess 140, allowing it to move laterally within the recess. In an exemplary embodiment, the diameter of the front plate 124 may be about 0.4 inch. Further, in a preferred embodiment, the height of the front plate 124 does not exceed the height of the exterior recess 140, preserving as much as possible the smooth exterior of the shroud plate 110. In an exemplary embodiment, the depth of the exterior recess 140 may be about 0.07 inch.

With reference to FIG. 12, an interior recess 142 may be machined or molded into the shell 113, preferably aligned with the corresponding exterior recess 140. In the depicted embodiment, the interior recesses 142 are circular, but the exact shape of the recesses is not critical. In an exemplary embodiment, the diameter of the interior recess 142 may be about 0.41 inch and the depth of the interior recess may be about 0.04 inch. The floating point assembly may be assembled as follows. The threaded cylinder 122 may be inserted through the hole in the shell 113 from the exterior so that the front plate 124 is substantially flush with the exterior surface of the shell. A washer 126 may be placed over the outside of the threaded cylinder 122 from the interior of the shell and flush with the interior recess 142, and then the interior end of the threaded cylinder 122 may be swaged to capture the washer between the cylinder and the shell 113. Preferably the area of the washer 126 is smaller than the area of the interior recess 142, allowing lateral movement of the washer within the recess. In an exemplary embodiment, the outer diameter of the washer 126 may be about 0.31 inch and the inner diameter may be about 0.15 inch.

The floating attachment point assembly described above allows for lateral movement of the threaded cylinder 122 within the hole in the shell 113. This lateral movement allows the shroud plate 110 to be attached to a helmet with screws or any other appropriate attachment means without drilling more holes or expanding the diameter of existing holes, even if the location of the holes for attaching the shroud plate 110 to the helmet varies from helmet to helmet. Further, the combination of the front plate 124 and the washer 126 allows the shroud plate 110 to be securely attached to the helmet.

Figure 13:
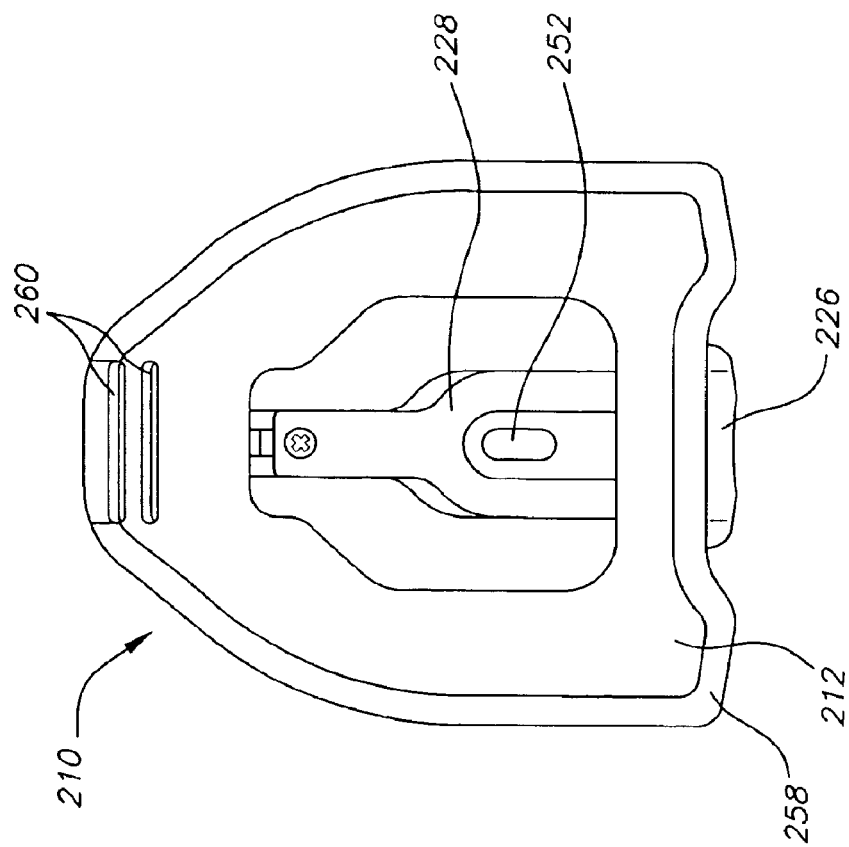
FIG. 13 is a front view of a shroud plate of the present invention having a single attachment point.

Due to perhaps a previous night vision goggle mount or other device attached to a helmet or due to a hole needed to attach the internal webbing for a user's head, some helmets have only a single hole at the front of the helmet for which to attach a shroud plate. Moreover, some helmets have no holes to start with at the front of the helmet. Rather than drilling more holes, or more than one hole, which may compromise the structural integrity of the helmet, a shroud plate 210, as shown in FIGS. 13 and 14, may be adapted to be attached to a helmet having only a single attachment point.

As with previously described embodiments of the present invention, the shroud plate may comprise shell 212 made from nylon 6/6 or any other appropriate material. Further, the shroud plate 210 may be manufactured to fit the contour of a helmet and the top surface of the shell 213 may be smooth with rounded edges and corners. The smooth contoured surface of the shell 212 minimizes any unnecessary edges on which another object may catch.

Also as with previously described embodiments, the shroud plate 210 may have a generally centrally located insert or receiving plate 216. A recess 250 may be machined or molded into the insert 216 and a hole 252 may be drilled through the center of the recess. The recess 250 and the hole 252 may be adapted to receive a single screw which serves to attach the shroud plate 210 to a helmet. The hole 252 may have an elongated opening greater than the diameter of the screw along a vertical axis, allowing the shroud plate 210 to be placed in slightly different vertical locations depending on the type of helmet to which it will attach and the location of the hole on the helmet. The recess is also preferably deeper than the height of the head of the screw so that, when in place, the screw does not interfere with a locking plate placed in the insert.

Figure 14:
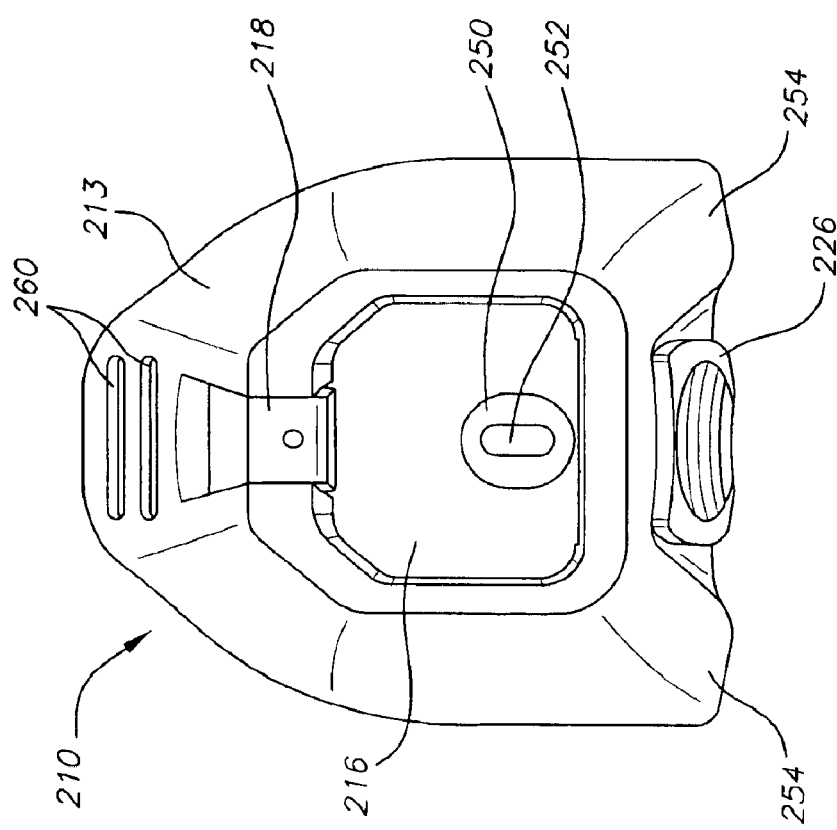
FIGS. 14 and 14a are back views of a shroud plate of the present invention having a single attachment point.
Figure 14A:
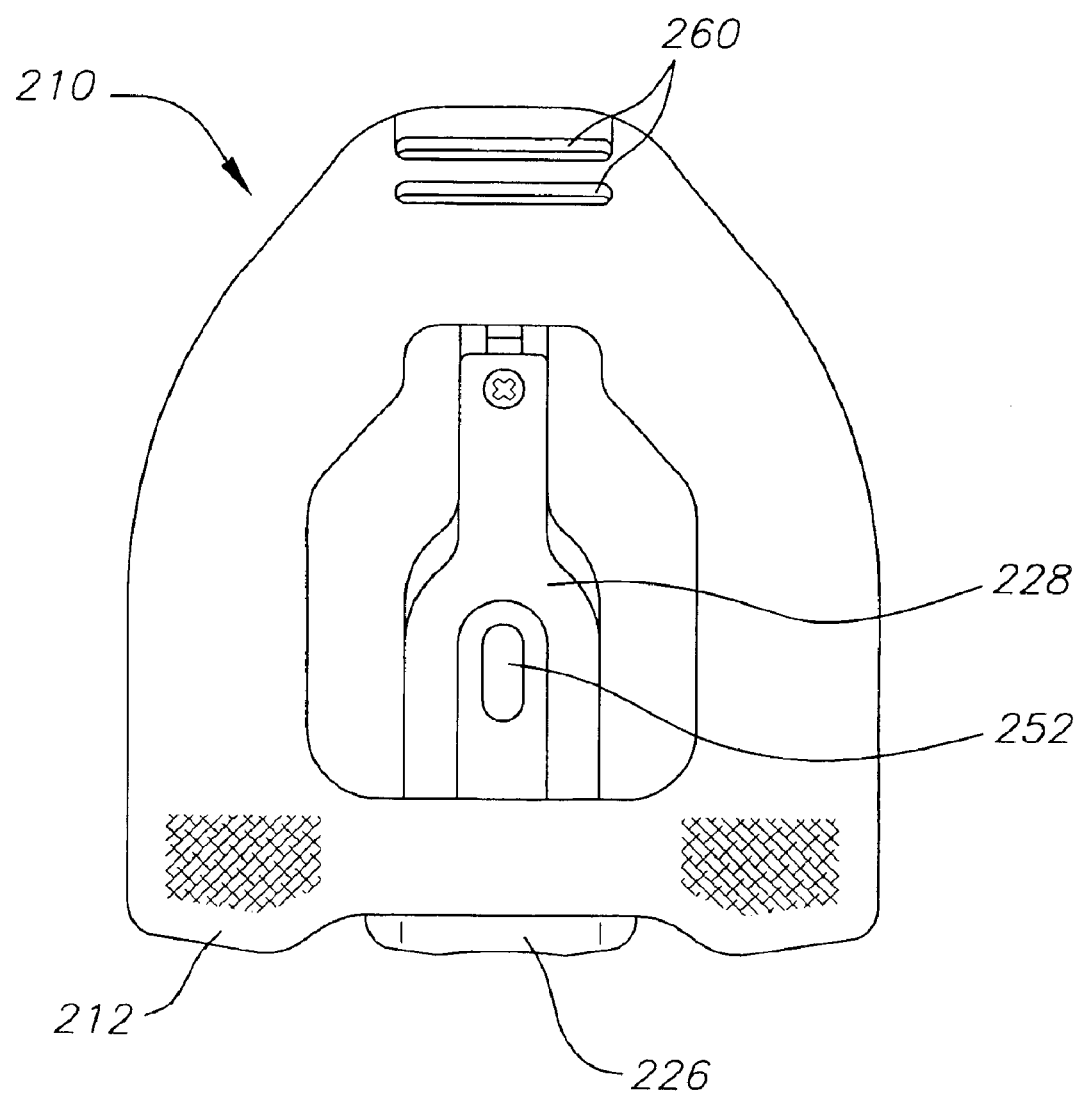

The shroud plate 210 may further contain a lock 218 connected to a release button 226 by a link plate 228 (FIG. 14). The link plate 228 may be adapted to allow the release button 226 to be connected to the lock 218 despite the hole 252 aligned in between the release button and the lock, and the screw protruding therethrough. In the depicted embodiment, the link plate 228 may have a generally tuning-fork shape, allowing for the hole and screw to pass between the two tines of the fork. However, the exact shape of the link plate 228 is not critical as long as it allows a user to move the lock 218 by depressing the release button 226.

Due to the single point of attachment of such embodiments of the shroud plate 210, there is less rotational stability provided than for a shroud plate attached at more than a single point. Thus, additional stability may be provided for such single-attachment point embodiments in numerous ways. First, for helmets not having a significant front brim, the shape of the shroud plate may include legs 254 which are adapted to extend over and rest on a rubbery outer lining of the helmet. The interior surface of the legs 254 over the outer lining may be textured or otherwise contoured to grip or bite into the outer lining as the shroud plate is tightened onto the helmet. The legs 254 then act as additional resistance points to rotational forces that may be applied to the shroud plate, for example, when a night vision mount is removed from the insert 216. Second, rather than resting on the lining of the helmet, each of the legs 254 may wrap around the edge of the helmet to act as a claw to prevent rotation.

Third, as shown in FIG. 14, the interior surface of the shell 213 may include a ridge 258 running along the outer edge of the interior surface of the shell. In one embodiment, the ridge 258 may be elevated approximately 0.02 inch to 0.06 inch over the rest of the shell 213. It has been found that when the single screw is tightened through the hole in the shroud plate 210 and into the helmet, the force of the screw on the ridge creates a large amount of friction on the outer edge of the shell 213 which prevents rotation of the shroud plate 210 under normal operating conditions.

For helmets having a significant front brim, on the other hand, the legs 254 of the shroud plate 210 may abut the brim, as is described in more detail below.

The present embodiment further includes vents 260 located near the top end of the shroud plate 210. The vents 260 may be adapted to receive a strap (not shown), one end of which may be hooked or otherwise attached to the edge of the helmet, the other end of which may be threaded through the vents 260 and secured. The threaded strap provides another attachment point for the shroud plate 210 and provides further resistance to rotation. Additionally, the strap may serve to keep the shroud plate 210 secured to the helmet should the night vision mount accidentally detach from the shroud plate 210 or should the screw become loosened and fall off.

In yet another embodiment of the present invention, as shown in FIGS. 15 and 16, a shroud plate 310 is adapted to be attached to a helmet having a brim. A helmet having such a brim makes difficult the placement of a release button at the bottom of a shroud plate such as described with respect to previous embodiments and as shown, for example, in FIG. 4. Rather, a base 360 of the shroud plate 310 is adapted to abut the brim of the helmet. More specifically, the base 360 of the shroud plate 310 is contoured such that when the shroud plate is attached to a helmet, the base 360 is flush with the curvature of the brim of the helmet. The abutment of the base of the shroud plate 310 with the brim of the helmet provides additional stability to the shroud plate, particularly with respect to rotational forces. Alternatively, as noted above, should the helmet not have a brim, the base 360 may project inwardly to wrap around the edge of the helmet.

Figure 17:
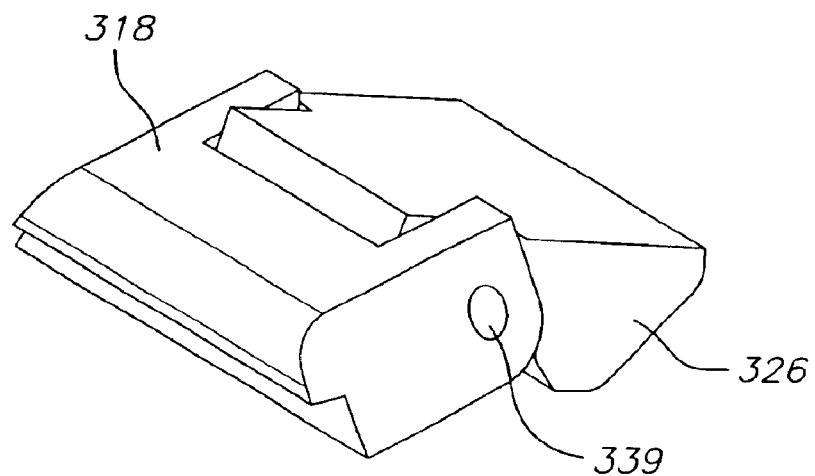
FIG. 17 is a perspective view of a lock-release button assembly of the present invention.
Figure 18:
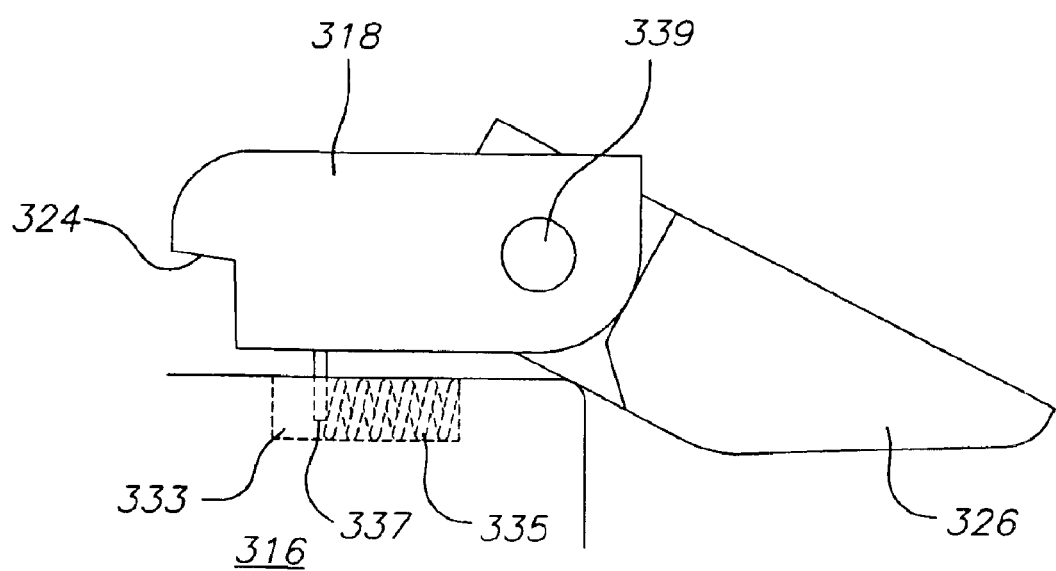
FIG. 18 is a side view of a lock-release button assembly of the present invention.

Additionally, rather than incorporating a link plate between a lock and a release button, the release button 316 may be directly connected to the lock 318 as shown in FIGS. 17 and 18. More specifically, the release button 326 may be rotatably attached to the lock 318 by a hinge pin 339. In an exemplary embodiment, a spring pin 337 is attached to and extends downward from the lock 318 into a pocket 333 in an insert 316. A spring 335 may be placed in the pocket 333, and the spring may bias the spring pin-lock assembly so that a tapered ledge 324 protrudes over the edge of the insert 316. When the release button 326 is depressed so that the force of the spring 335 is overcome, the button may pivot around an edge of the insert 316, thereby pulling the lock 318 in the direction of the release button and allowing a user to disengage a night vision mount attached thereto. In an alternate embodiment, a roller, for example, in the form of a cylinder, may be incorporated around the hinge pin to ensure smooth operation of the lock-release button assembly. The position and construction of the lock-release button assembly described immediately above still allows a user a single-handed approach to disengage a night vision mount from the shroud plate while minimizing the possibility of a tree branch or other obstruction from accidentally disengaging the mount. Additionally, it allows an effective, smooth shroud plate to be mounted onto a helmet with a brim.

Further, as described above with respect to a previous embodiment, the shroud plate 310 may include vents 362 located near the top end. The vents may be adapted to receive a strap (not shown), one end of which may be hooked or otherwise attached to the edge of the helmet, the other end of which may be threaded through the vents 362 and secured. The threaded strap provides another attachment point for the shroud plate 310 and provides further resistance to rotation.

While various embodiments of this invention have been shown and described, it would be apparent to those skilled in the art that many more modifications are possible without departing from the inventive concept herein. It is, therefore, to be understood that within the scope of the appended claims, this invention may be practiced otherwise than as specifically described.

I claim:

1. A shroud plate for headgear comprising a shell, an insert, a lock, a release mechanism and at least one attachment means wherein the shell extends around at least a portion of the insert and has a smooth surface with rounded edges and corners and is shaped to match the contour of the headgear;

the insert is adapted to receive a lock plate;

the lock is adapted to secure the lock plate to the insert;

the release mechanism allows for removal of the lock plate from the insert; and the at least one attachment means is laterally movable within a restricted area.

2. The shroud plate of claim 1 wherein the at least one attachment means comprises a threaded cylinder and a face plate, wherein the faceplate is attached to one end of the cylinder.

3. The shroud plate of claim 2 wherein the at least attachment means further comprises a washer wherein the threaded cylinder is inserted through the washer and wherein the cylinder is swaged to prevent the washer from being separated from the cylinder.

4. A shroud plate for headgear comprising a shell, an insert, a lock, a release mechanism, and a single hole adapted to receive an attachment means to attach the shroud plate to the headgear wherein the shell extends around at least a portion of the insert and has a smooth surface with rounded edges and corners and is shaped to match the contour of the headgear;

the insert is adapted to receive a lock plate;

the lock is adapted to secure the lock plate to the insert; and the release mechanism allows for removal of the lock plate from the insert.

5. The shroud plate according to claim 4 further comprising an elevated ridge to provide rotational stability to the shroud plate.

6. The shroud plate according to claim 4 further comprising legs that are adapted to extend over an outer lining of the headgear, wherein an interior surface of the legs are textured to grip the outer lining.

7. The shroud plate according to claim 4 further comprising legs that are adapted to wrap around an edge of the headgear to provide rotational stability to the shroud plate.

8. A shroud plate for headgear comprising a shell, an insert, a lock, a release mechanism and at least one attachment means wherein the shell extends around at least a portion of the insert and has a smooth surface with rounded edges and corners and is shaped to match the contour of the headgear;

the insert is adapted to receive a lock plate;

the lock is adapted to secure the lock plate to the insert;

the release mechanism allows for removal of the lock plate from the insert; and an interior surface of the shell further comprises an elevated ridge to provide rotational stability to the shroud plate.

9. A shroud plate for headgear comprising a shell, an insert, a lock, a release mechanism, at least one attachment means and a plurality of legs wherein the shell extends around at least a portion of the insert and has a smooth surface with rounded edges and corners and is shaped to match the contour of the headgear;

the insert is adapted to receive a lock plate;

the lock is adapted to secure the lock plate to the insert;

the release mechanism allows for removal of the lock plate from the insert; and the plurality of legs is adapted to extend over an outer lining of the headgear and an interior surface of each leg is textured to grip the outer lining of the headgear.

10. A shroud plate for headgear comprising a shell, an insert, a lock, a release mechanism, at least one attachment means and a plurality of legs wherein the shell extends around at least a portion of the insert and has a smooth surface with rounded edges and corners and is shaped to match the contour of the headgear;

the insert is adapted to receive a lock plate;

the lock is adapted to secure the lock plate to the insert;

the release mechanism allows for removal of the lock plate from the insert; and the plurality of legs are adapted to wrap around an edge of the headgear to provide rotational stability to the shroud plate.

\* \* \* \* \*

UNITED STATES PATENT AND TRADEMARK OFFICE
CERTIFICATE OF CORRECTION

PATENT NO. : 6,938,276 B1
DATED : September 6, 2005
INVENTOR(S) : Prendergast

It is certified that error appears in the above-identified patent and that said Letters Patent is hereby corrected as shown below:

Title page,
Item [56], References Cited, OTHER PUBLICATIONS,
insert -- U.S. Patent Application No. 10/818,828, by inventor Prendergast, filed 04/05/2004 --.

Column 8,
Line 45, after "at least", insert -- one --.

Signed and Sealed this

Twenty-eighth Day of February, 2006

JON W. DUDAS
*Director of the United States Patent and Trademark Office*

(12) EX PARTE REEXAMINATION CERTIFICATE (7833rd)
United States Patent
Prendergast

(10) Number: US 6,938,276 C1
(45) Certificate Issued: *Oct. 26, 2010

(54) SHROUD PLATE ATTACHMENT

(75) Inventor: Jonathon R. Prendergast, Newport Beach, CA (US)

(73) Assignee: Norotos, Inc., Santa Ana, CA (US)

Reexamination Request:
No. 90/010,570, Jun. 26, 2009

Reexamination Certificate for:
Patent No.: 6,938,276
Issued: Sep. 6, 2005
Appl. No.: 10/820,977
Filed: Apr. 7, 2004

(*) Notice: This patent is subject to a terminal disclaimer.

Certificate of Correction issued Feb. 28, 2006.

(51) Int. Cl.
*A42B 1/24* (2006.01)

(52) U.S. Cl. .............................. 2/422; 2/6.2; 403/408.1
(58) Field of Classification Search ........................ 2/422
See application file for complete search history.

(56) References Cited

U.S. PATENT DOCUMENTS 4,195,328 A 3/1980 Harris, Jr.
4,324,517 A 4/1982 Dey

OTHER PUBLICATIONS

"Operator's Manual Night Vision Goggles AN/PVS–7B (NSN 5855–01–228–0937) (EIC: IPS) and AN/PVS–7D (NSN 5855–01–422–5413) (EIC:N/A)", pp. 1–12 and 2–54 to 2–58, by the Departments of the Army, the Navy, and the Air Force and Headquarters, Marine Corps, dated Dec. 1, 1997.

Pacer Performance Products Catalog, "Hi–Five Cab Roof Lights", 2002.

U.S. Appl. No. 10/818,828, by inventor Prendergast, filed Apr. 5, 2004.

*Primary Examiner*—Jimmy T Nguyen

(57) ABSTRACT

A shroud plate for headgear is provided that may comprise a shell, an insert, a lock, a release mechanism wherein the shell extends around at least a portion of the insert has a smooth surface with rounded edges and corners and is shaped to match the contour of the headgear, and at least one attachment point wherein the attachment point is laterally movable within a restricted area. Further, the shroud plate may be attachable to headgear at a single attachment point and may be given rotational stability by an elevated ridge or a plurality of legs which may extend over or wrap around an edge of the headgear.

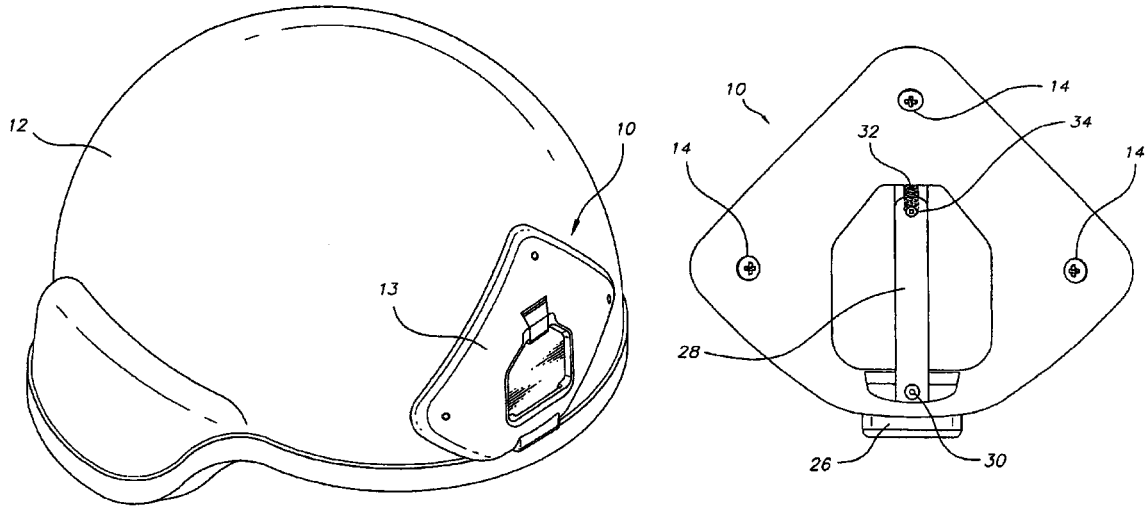

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4 and 8-10 are cancelled.

Claims 2, 5, 6 and 7 are determined to be patentable as amended.

Claim 3, dependent on an amended claim, is determined to be patentable.

New claims 11-20 are added and determined to be patentable.

2. The shroud plate of claim [1] *14* wherein the at least one attachment means comprises a threaded cylinder and a face plate, wherein the faceplate is attached to one end of the cylinder.

5. The shroud plate according to claim [4] *14* further comprising an elevated ridge to provide rotational stability to the shroud plate.

6. The shroud plate according to claim [4] *14* further comprising legs that are adapted to extend over an outer lining of the headgear, wherein an interior surface of the legs are textured to grip the outer lining.

7. The shroud plate according to claim [4] *14* further comprising legs that are adapted to wrap around an edge of the headgear to provide rotational stability to the shroud plate.

*11. A shroud plate for headgear comprising a shell, an insert, a lock, a release mechanism, and at least one attachment means,*

*wherein the shell extends around at least a portion of the insert and has an external surface that faces away from the headgear when the shroud plate is attached to the headgear, a back surface that faces toward the headgear when the shroud plate is attached to the headgear and a periphery;*

*wherein the external surface is smooth with rounded edges and corners at the periphery, such that the shell has no projections on which a shroud line may catch;*

*wherein the back surface is shaped to match the contour of the headgear such that at least the periphery of the shell fits to the headgear;*

*wherein the insert is adapted to receive a lock plate;*

*wherein the lock is adapted to secure the lock plate to the insert;*

*wherein the release mechanism allows for removal of the lock plate from the insert; and*

*wherein the at least one attachment means is laterally movable within a restricted area.*

*12. A shroud plate for headgear comprising a shell, an insert, a lock, a release mechanism, and at least one attachment means,*

*wherein the shell extends around at least a portion of the insert and has an external surface that faces away from the headgear when the shroud plate is attached to the headgear, a back surface that faces toward the headgear when the shroud plate is attached to the headgear and a periphery;*

*wherein the external surface is smooth with rounded edges and corners at the periphery, such that the shell has no projections on which a shroud line may catch and is shaped to match the contour of the headgear;*

*wherein the insert is adapted to receive a lock plate;*

*wherein the lock is adapted to secure the lock plate to the insert;*

*wherein the release mechanism allows for removal of the lock plate from the insert; and*

*wherein the at least one attachment means is laterally movable within a restricted area.*

*13. A shroud plate for headgear comprising a shell, an insert, a lock, a release mechanism, and a single hole adapted to receive at least one attachment means to attach the shroud plate to the headgear,*

*wherein the shell extends around at least a portion of the insert and has an external surface that faces away from the headgear when the shroud plate is attached to the headgear, a back surface that faces toward the headgear when the shroud plate is attached to the headgear and a periphery;*

*wherein the external surface is smooth with rounded edges and corners at the periphery, such that the shell has no projections on which a shroud line may catch;*

*wherein the back surface is shaped to match the contour of the headgear such that at least the periphery of the shell fits to the headgear;*

*wherein the insert is adapted to receive a lock plate;*

*wherein the lock is adapted to secure the lock plate to the insert; and*

*wherein the release mechanism allows for removal of the lock plate from the insert.*

*14. A shroud plate for headgear comprising a shell, an insert, a lock, a release mechanism, and a single hole adapted to receive at least one attachment means to attach the shroud plate to the headgear,*

*wherein the shell extends around at least a portion of the insert and has an external surface that faces away from the headgear when the shroud plate is attached to the headgear, a back surface that faces toward the headgear when the shroud plate is attached to the headgear and a periphery;*

*wherein the external surface is smooth with rounded edges and corners at the periphery, such that the shell has no projections on which a shroud line may catch and is shaped to match the contour of the headgear;*

*wherein the insert is adapted to receive a lock plate;*

*wherein the lock is adapted to secure the lock plate to the insert; and*

*wherein the release mechanism allows for removal of the lock plate from the insert.*

*15. A shroud plate for headgear comprising a shell, an insert, a lock, a release mechanism, and at least one attachment means,*

*wherein the shell extends around at least a portion of the insert and has an external surface that faces away from the headgear when the shroud plate is attached to the headgear, a back surface that faces toward the head-* gear when the shroud plate is attached to the headgear and a periphery;

wherein the external surface is smooth with rounded edges and corners at the periphery, such that the shell has no projections on which a shroud line may catch;

wherein the back surface is shaped to match the contour of the headgear such that at least the periphery of the shell fits to the headgear;

wherein the insert is adapted to receive a lock plate;

wherein the lock is adapted to secure the lock plate to the insert;

wherein the release mechanism allows for removal of the lock plate from the insert; and wherein the back surface of the shell further comprises an elevated ridge to provide rotational stability to the shroud plate.

16. A shroud plate for headgear comprising a shell, an insert, a lock, a release mechanism, and at least one attachment means, wherein the shell extends around at least a portion of the insert and has an external surface that faces away from the headgear when the shroud plate is attached to the headgear, a back surface that faces toward the headgear when the shroud plate is attached to the headgear and a periphery;

wherein the external surface is smooth with rounded edges and corners at the periphery, such that the shell has no projections on which a shroud line may catch and is shaped to match the contour of the headgear;

wherein the insert is adapted to receive a lock plate;

wherein the lock is adapted to secure the lock plate to the insert;

wherein the release mechanism allows for removal of the lock plate from the insert; and wherein the back surface of the shell further comprises an elevated ridge to provide rotational stability to the shroud plate.

17. A shroud plate for headgear comprising a shell, an insert, a lock, a release mechanism, at least one attachment means, and a plurality of legs, wherein the shell extends around at least a portion of the insert and has an external surface that faces away from the headgear when the shroud plate is attached to the headgear, a back surface that faces toward the headgear when the shroud plate is attached to the headgear and a periphery;

wherein the external surface is smooth with rounded edges and corners at the periphery, such that the shell has no projections on which a shroud line may catch;

wherein the back surface is shaped to match the contour of the headgear such that at least the periphery of the shell fits to the headgear;

wherein the insert is adapted to receive a lock plate;

wherein the lock is adapted to secure the lock plate to the insert;

wherein the release mechanism allows for removal of the lock plate from the insert; and wherein the plurality of legs are adapted to extend over an outer lining of the headgear and an interior surface of each leg is textured to grip the outer lining of the headgear.

18. A shroud plate for headgear comprising a shell, an insert, a lock, a release mechanism, at least one attachment means, and a plurality of legs, wherein the shell extends around at least a portion of the insert and has an external surface that faces away from the headgear when the shroud plate is attached to the headgear, a back surface that faces toward the headgear when the shroud plate is attached to the headgear and a periphery;

wherein the external surface is smooth with rounded edges and corners at the periphery, such that the shell has no projections on which a shroud line may catch and is shaped to match the contour of the headgear;

wherein the insert is adapted to receive a lock plate;

wherein the lock is adapted to secure the lock plate to the insert;

wherein the release mechanism allows for removal of the lock plate from the insert; and wherein the plurality of legs are adapted to extend over an outer lining of the headgear and an interior surface of each leg is textured to grip the outer lining of the headgear.

19. A shroud plate for headgear comprising a shell, an insert, a lock, a release mechanism, at least one attachment means, and a plurality of legs, wherein the shell extends around at least a portion of the insert and has an external surface that faces away from the headgear when the shroud plate is attached to the headgear, a back surface that faces toward the headgear when the shroud plate is attached to the headgear and a periphery;

wherein the external surface is smooth with rounded edges and corners at the periphery, such that the shell has no projections on which a shroud line may catch;

wherein the back surface is shaped to match the contour of the headgear such that at least the periphery of the shell fits to the headgear;

wherein the insert is adapted to receive a lock plate;

wherein the lock is adapted to secure the lock plate to the insert;

wherein the release mechanism allows for removal of the lock plate from the insert; and wherein the plurality of legs are adapted to wrap around an edge of the headgear to provide rotational stability to the shroud plate.

20. A shroud plate for headgear comprising a shell, an insert, a lock, a release mechanism, at least one attachment means, and a plurality of legs, wherein the shell extends around at least a portion of the insert and has an external surface that faces away from the headgear when the shroud plate is attached to the headgear, a back surface that faces toward the headgear when the shroud plate is attached to the headgear and a periphery;

wherein the external surface is smooth with rounded edges and corners at the periphery, such that the shell has no projections on which a shroud line may catch and is shaped to match the contour of the headgear;

wherein the insert is adapted to receive a lock plate;

wherein the lock is adapted to secure the lock plate to the insert;

wherein the release mechanism allows for removal of the lock plate from the insert; and wherein the plurality of legs are adapted to wrap around an edge of the headgear to provide rotational stability to the shroud plate.

* * * * *